United States Patent [19]

Spector et al.

[11] Patent Number: 4,765,244

[45] Date of Patent: Aug. 23, 1988

[54] APPARATUS FOR THE DETECTION AND DESTRUCTION OF INCOMING OBJECTS

[75] Inventors: Yechiel Spector, Tel Aviv; Ilan Cohen, Petach Tikva; Azriel Lorber, Kiryon, all of Israel

[73] Assignee: Spectronix Ltd., Tel Aviv, Israel

[21] Appl. No.: 836,683

[22] Filed: Mar. 6, 1986

Related U.S. Application Data

[63] Continuation-in-part of Ser. No. 485,414, Apr. 15, 1983, abandoned.

[51] Int. Cl.⁴ ................. F42C 13/00; F41H 13/00; G08B 19/00
[52] U.S. Cl. ................. 102/213; 89/1.11; 89/41.03; 340/522
[58] Field of Search ........... 102/213, 214, 427; 89/1.11, 41.03, 41.05, 41.06, 41.07, 41.22; 340/522, 554, 578

[56] References Cited

U.S. PATENT DOCUMENTS

| | | | |
|---|---|---|---|
| 3,046,892 | 7/1962 | Cosse et al. | 102/213 |
| 3,500,397 | 3/1970 | Buchholz et al. | 89/41.03 |
| 3,509,791 | 5/1970 | Pechamat et al. | 102/427 |
| 3,573,817 | 4/1971 | Akers | 340/420 |
| 3,653,016 | 3/1972 | Cormier | 250/372 |
| 3,893,368 | 7/1975 | Wales, Jr. | 102/427 |
| 3,902,172 | 8/1975 | Weiss et al. | 102/213 |
| 3,924,233 | 12/1975 | Nastronero et al. | 102/213 |
| 3,946,233 | 3/1976 | Erben et al. | 89/1.11 |
| 4,101,767 | 7/1978 | Lennington et al. | 250/339 |
| 4,193,072 | 3/1980 | McKusick | 102/213 |
| 4,245,559 | 1/1981 | Wakeman et al. | 102/213 |
| 4,270,613 | 6/1981 | Spector et al. | 89/36.08 |
| 4,357,534 | 11/1982 | Ball | 250/339 |
| 4,414,542 | 11/1983 | Farquhar et al. | 340/578 |
| 4,422,075 | 12/1983 | Nerheim | 102/214 |
| 4,423,326 | 12/1983 | Ball | 250/339 |

FOREIGN PATENT DOCUMENTS

| | | |
|---|---|---|
| 0066952 | 12/1982 | European Pat. Off. . |
| 1342552 | 1/1974 | United Kingdom . |
| 1504414 | 3/1978 | United Kingdom . |
| 2012092 | 7/1979 | United Kingdom . |
| 2020870 | 11/1979 | United Kingdom . |
| 2050025 | 12/1980 | United Kingdom . |
| 2060967 | 5/1981 | United Kingdom . |
| 2083672 | 3/1982 | United Kingdom . |
| 2089503 | 6/1982 | United Kingdom . |
| 2103789 | 2/1983 | United Kingdom . |
| 2122004 | 1/1984 | United Kingdom . |

*Primary Examiner*—Charles T. Jordan
*Attorney, Agent, or Firm*—Browdy and Neimark

[57] ABSTRACT

Detection apparatus which is sensitive both to radiation and to the proximity of the radiation source, as well as destruction apparatus embodying detection apparatus.

39 Claims, 10 Drawing Sheets

APPARATUS FOR THE DETECTION AND DESTRUCTION OF INCOMING OBJECTS

CROSS REFERENCE TO RELATED APPLICATION

The present application is a continuation-in-part of application Ser. No. 06/485,414, filed Apr. 15, 1983, now abandoned in favor of continuation application ser. No. 06/885,805, filed July 15, 1986.

FIELD OF THE INVENTION

The present invention relates to apparatus for the detection of incoming objects such as missiles, and more particularly to such apparatus wherein the detection means includes radar, and IR and/or UV detectors.

BACKGROUND OF THE INVENTION

Ground-targeted objects and in particular missiles present an increasing threat to ground installations and more especially to vehicles such as tanks, armoured personnel carriers and self-propelled guns. So far as vehicles are concerned, these are in particular threatened by the anti-tank guided missile, the shoulder-fired rocket, artillary and air-deliverable guided and cluster munitions, as well as by the variety of hollow-charge tipped weapons. Such incoming objects may be unguided, but are more usually manually wire-guided, semi-automatic wire or beam riding and increasingly fully automatic embodying fire and forget systems. They have a flight velocity in the range of about 140 to about 300 m/sec, but it is anticipated that current development will increase this maximum, possibly up to about 500 m/sec.

There are a number of possible solutions to the problem of damage and casualties due to the incoming object hitting its target. One is post-hit damage control, which, however successful it might be statistically, has the disadvantage of exposing the occupants of the installation or vehicle to the effects at least of the control or extinguishing means, and to the effect of an explosion should the control means fail; it is therefore very much of a "last-ditch" solution. A further possible solution is based on penetration prevention, e.g. by increasing the amount and effectiveness of the armour on a vehicle. However, it has been calculated that a one-inch increase in missile diameter will necessitate an additional 10-15 tons of armour to nullify its effect, so this is hardly a practical solution in the long-term, since it would lead to increasingly heavy and expensive armoured vehicles. Yet a further solution has been sought in the development of decoy methods which confuse or disrupt the missile's guidance system, or its operator. Such attempts have met with some success, but they cannot cover the wide variety of guidance systems and modes of operation in use or liable to be used in the future.

Finally, it is realized that the preferred solution should be to destroy the potential threat while it is still a threat, that is to say, while it is still en route to the target.

It is a manor object of the present invention to provide a solution to this problem along the lines just mentioned. An acceptable solution of this kind should have the following features, and such features constitute further objects of the invention:

(1) be an add-on, self-contained system;
(2) each installation or vehicle should be independently protected;
(3) be designed and built to withstand a variety of climatic and battle conditions;
(4) not interfere with the installation's or the vehicle's personnel, and in the case of a vehicle should not interfere with its primary mission;
(5) be immune from false alarms;
(6) will not increase the threat to personnel by providing detection or homing means to the enemy;
(7) be compatible with the installation's or the vehicle's operational environment;
(8) not endanger the crew or adjacent personnel; and
(9) have low weight, small physical size, no additional signature and a low price.

It is believed that at least most of these objects are met in the apparatus provided by the invention.

PRIOR ART

There are known a number of fire and explosion detection systems employing UV and IR detectors in combination; the relevance of such prior art to the present invention will appear from the description hereinafter. Examples of such systems are illustrated in the following U.S. Patents: U.S. Pat. Nos. 3,665,440, 3,653,016 and 4,270,613. The apparatus described in U.S. Pat. No. 3,665,440 provides an alarm output when IR is detected in the absence of UV. The apparatus described in U.S. Pat. No. 3,653,016 provides an alarm output when IR and UV are detected together but also includes a portion of the visible spectrum in the detection ranges of its detectors.

U.S. Pat. No. 4,270,613 of the present Assignee describes a particularly useful detection system which provides an output indication in response to coincident detection of UV and IR wherein the detection bands exclude the visible spectrum.

U.S. Pat. No. 3,893,368 (Wales) discloses the generation of a jet sheet of high velocity particles and shock waves as a method of protecting a target against attack, especially from a bazooka. The jet sheet is generated at an instant when the forward portion of the incoming projectile lies in the jet plane, so that the projectile is turned aside. As will appear from the description of the present invention, infra, in one aspect destruction apparatus is provided which in a particular embodiment uses a high density barrier of small particles. This barrier does not physically turn aside the incoming object (as in Wales), but is a target simulator in the path of the incoming object.

SUMMARY OF THE INVENTION

The present invention seeks to provide detection apparatus which is sensitive both to radiation and to the proximity of the radiation source, as well as destruction apparatus embodying detection apparatus.

The incoming objects, which it is desired to detect and destroy, frequently emit a plume of very hot gases and/or flames which may be detected at a distance by (e.g.) UV sensors, and at a very much shorter distance when the intensity of the radiation is greater than the solar background radiation, by IR detectors. It will be apparent that a combination of UV and IR sensors may be used to measure the speed of approach of the plumes and/or flames. In accordance with the invention, radar is also used, in combination with the UV and IR sensors, as will be discribed herein. Thus, radar may be used in a complementary or supplementary manner to detect the location, direction and/or speed of approach of the incoming objects. Moreover, the apparatus of the invention may include means making use of the Doppler effect in addition to the other means herein described.

The invention accordingly provides apparatus for the detection of incoming objects, such objects being characterized by a detectable change in the observed intensity of infrared radiation emitted therefrom as said objects approach said apparatus, which comprises:

(a) proximity determination apparatus providing an output and comprising: (i) apparatus for detecting simultaneous radiation sensing in a plurality of different ranges within the infrared ranges, and (ii) radar apparatus;

(b) radiation detection apparatus providing an output and comprising at least UV radiation sensing apparatus; and (c) apparatus for providing an alarm indication only in response to a predetermined combination of outputs from said proximity determination apparatus and said radiation detecting apparatus.

The plurality of different ranges may comprise both the Near IR and the Far IR. The radiation detection apparatus may comprise additionally IR radiation sensing apparatus. The proximity determination apparatus may also include apparatus for determining the rate of change of radiation in at least one range of the plurality of different ranges. In one embodiment, the proximity determination apparatus may further include level and slope threshold indicators connected in parallel; in an alternative embodiment of the invention, these level and slope threshold indicators may be connected in series.

According to a particular embodiment of the apparatus according to the invention, the radar apparatus is adapted to provide an output; the apparatus for detecting simultaneous radiation sensing comprises a Near IR sensor, a Far IR sensor, apparatus for determining the rate of change of the output of the Near IR sensor and of the Far IR sensor; threshold apparatus for receiving the output of the rate of change determining apparatus and providing an output indication in excess of a predetermined threshold; and ANDing apparatus for receiving the outputs of the threshold apparatus, the radar apparatus and of the radiation detection apparatus for providing an alarm actuation signal.

It will be appreciated that where reference is made herein to ANDing apparatus, such ANDing apparatus may comprise a plurality of AND gates, each receiving signals from a different combination of sensors and providing a corresponding output.

Moreover, as indicated above, the radar apparatus may be used in a complementary or supplementary manner to detect location, direction and/or speed of incoming objects.

Thus, in a further embodiment which is an example of the apparatus according to the invention, in which radar is used in a complementary manner, the proximity determination apparatus is adapted to sense the proximity of incoming objects in at least two separate spatial segments, in one of which proximity determination apparatus is provided by radar, and in another of which proximity determination apparatus is provided by apparatus for detecting simultaneous radiation sensing in a plurality of different ranges within the infrared range. Thus, for example, the proximity determination apparatus may comprise a broadly vertical proximity determination apparatus provided by radar and a broadly lateral proximity determination apparatus provided by the apparatus for detecting simultaneous radiation sensing.

On the other hand, radar may be used in a supplementary manner to cover a coincident or overlapping spatial field, as that covered by apparatus for detecting simultaneous radiation sensing in a plurality of different ranges within the infrared range.

Furthermore, as previously noted, the proximity determination apparatus may include apparatus making use of the Doppler effect.

The detection apparatus according to the invention may be adapted to actuate apparatus for the destruction of the incoming object such that the latter is destructible at at least the maximum distance of warhead effectiveness. Thus, for example, the destruction means may be so actuated that the incoming object is destructible at a distance of about at least 3, preferably at least about 6 and most preferably within the range of about 6 to about 20 meters from its intended target. In an alternative embodiment, the destruction means may be so actuated that the incoming object is destructible at a distance within the range of about 20 to about 50 meters from its intended target. In yet a further embodiment, the destruction means may be so actuated that the incoming object is destructible at a distance of more than about 50 meters from its intended target.

In one aspect of the invention, the detection apparatus may be mounted on a movable base. Such a movable base may be, in one embodiment, a wheeled vehicle, or in another embodiment, a projectile.

In another aspect, the apparatus of the invention may be adapted to detect an incoming object at a predetermined distance from its intended target, as for example, at a distance of about 20 to about 30 meters therefrom.

In a further aspect, the invention provides a system for the destruction of incoming objects comprising: apparatus for the detection of incoming objects as hereinbefore described and providing an alarm signal, an actuation device triggered by the alarm signal and operative to actuate a projectile and a projectile comprising apparatus for the destruction of incoming objects.

In yet a further aspect, the invention provides a system for the destruction of incoming objects, such objects being characterized by a detectable change in the observed intensity of infrared radiation emitted therefrom as the objects approach said apparatus, which comprises:

(1) detection apparatus comprising: (a) proximity determination apparatus providing an output and comprising apparatus for detecting simultaneous radiation sensing in a plurality of different ranges within the infrared range; (b) radiation detection apparatus providing an output and comprising at least UV radiation sensing apparatus; and (c) apparatus for providing an alarm signal only in response to a predetermined combination of outputs from the proximity determination apparatus and the radiation detecting apparatus;

(2) actuation device triggered by the alarm signal and operative to actuate apparatus for the destruction of incoming objects; and (3) the destruction apparatus being comprised in a projectile or comprising an electromagnetic energy generating device. In this further aspect of the invention, the proximity determination apparatus may also comprise radar apparatus.

A destruction system in accordance with the present invention may embody any or all of the features of the detection apparatus of the invention, as has been described hereinabove.

The destruction system of the invention may comprise a projectile which includes in one alternative an explosive warhead (which may itself be comprised of either solid or powdered explosive), or in another alternative a fragmentation warhead. In yet a further alternative, the destruction system may comprise a projectile which includes a material adapted as a target simulator for projecting into the path of the incoming object. Such a material may be a liquid barrier substance, such as water. Preferably, however, the material is a solid, and in particular it may be a high density barrier of small particles, such as sand or gravel, which may be projected in one or more locations, so as to provide a target simulator. Such a high density barrier has a number of distinct advantages. These are: cheapness; ease of projecting to meet the incoming object, by means of a propellant; the speed of impact with the incoming object will be the combined speeds of the barrier and of the incoming object; the warhead of the incoming object will normally be pressure sensitive or proximity sensitive, e.g. it will usually be fused by a device such as a piezoelectric sensor, a breaker cup or a grid, so that it will be pre-detonated by the barrier short of its intended target; and lastly, the sand or gravel will be unlikely to cause serious casualties to ground personnel, compared with certain other means of destruction.

It will be appreciated that the actuation device for the destruction system may operate as a single, double or multiple shot operation, and that the destruction system may be directed variously or selectively. Preferably the destruction system embodies a projectile which will be directed in a direction opposite to that of the incoming object. More particularly the destruction system may be contained in a projectile which is projected into the path of the incoming object so as to meet it in a substantially head-on manner. In one aspect of the invention, the destruction system may be comprised in a projectile which includes also the detection apparatus.

The determination of which and how many projectiles embodying such destruction apparatus are to be utilized, and in which direction at what times they are to be so utilized, will be governed by control circuitry to be included as a preferable feature of the system of the present invention for the destruction of incoming objects.

In an alternative embodiment, the destruction system of the invention may comprise electromagnetic energy generating apparatus, that is to say that the actuation device will be effective to generate electromagnetic radiation, e.g. in the form of a laser beam, against the incoming object.

It is evident that the whole purpose of the detection apparatus and the destruction system of the invention is to detect and then destroy the incoming object before it reaches the intended target. For this reason, it is preferred that the times of detection and actuation and the characteristics of the destruction apparatus are such that the incoming object will be destructible at at least the maximum distance of warhead effectiveness. More preferably, the incoming object will be destructible at a distance of at least about three meters, and most preferably at least about six meters, from its intended target, as discussed hereinabove. It is apparent that it will therefore be preferable to detect the incoming object at a predetermined distance from its intended target; by way of example only, this distance may be e.g. about 20 to about 30 meters from the intended target.

BRIEF DESCRIPTION OF THE DRAWINGS

The present invention will be more clearly understood and appreciated from the following detailed description taken in conjunction with the drawings in which.

DETAILED DESCRIPTION OF THE INVENTION

Figure 1:
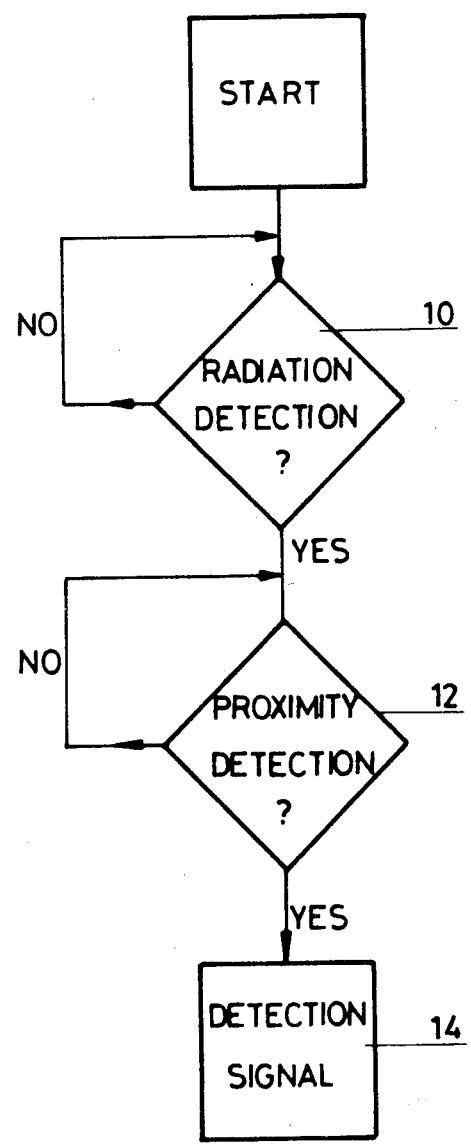
FIG. 1 is a general logic diagram of missile detection circuitry constructed and operative in accordance with the present invention.

Reference is now made to FIG. 1 which illustrates in logic diagram form, the operation of missile detection circuitry constructed and operative in accordance with an embodiment of the present invention. The operation of the detection circuitry is in a continuing radiation detection interrogation mode 10. Only when radiation having predetermined characteristics is detected is there interrogation for proximity detection 12. Only when proximity detection criteria are fulfilled following radiation detection is an alarm indication provided at 14.

Figure 2:
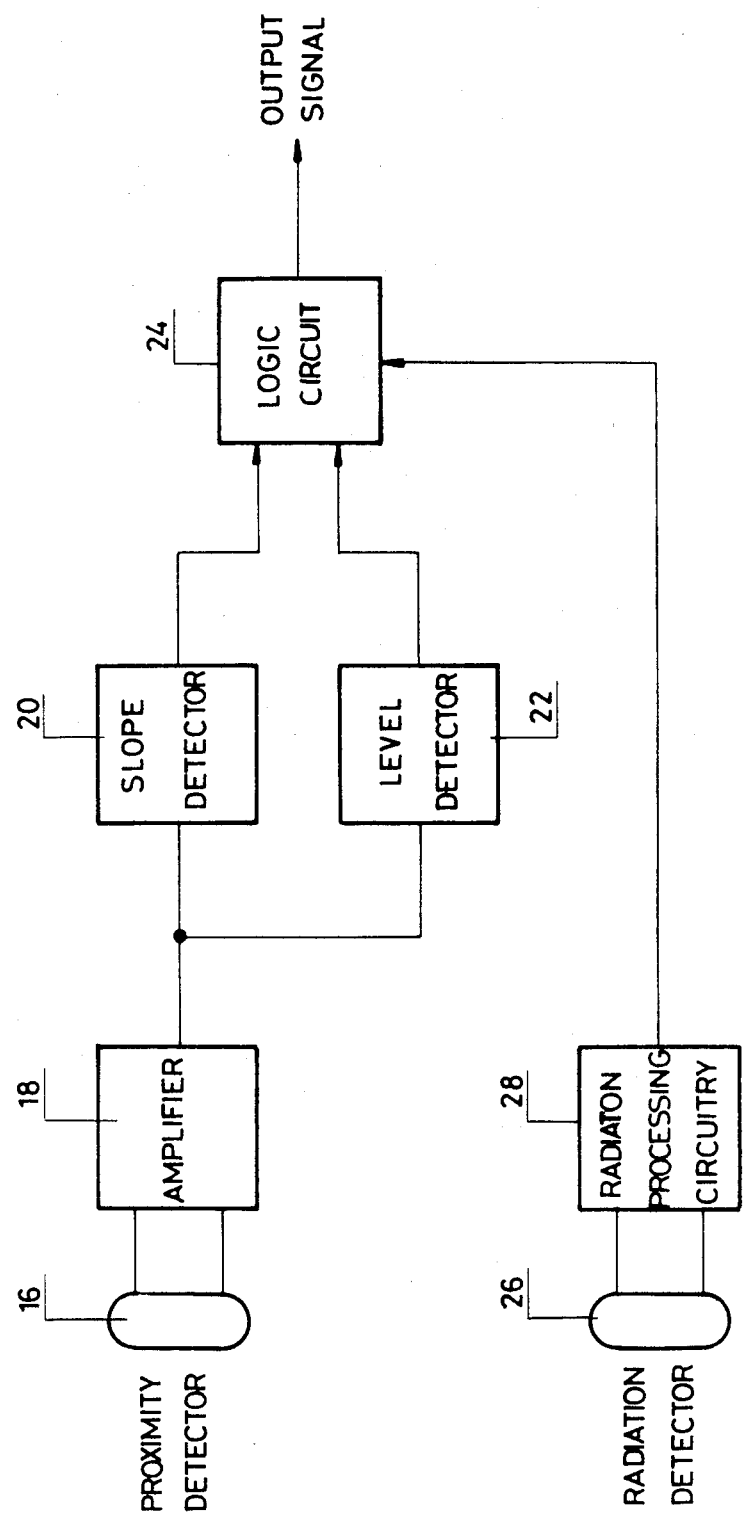
FIG. 2 is a block diagram illustration of missile detection circuitry constructed and operative in accordance with the present invention.

Referring now to FIG. 2 there is seen missile detection apparatus which produces the functions described above in connection with FIG. 1. A proximity sensor 16 provides an output to an amplifier 18. The output from amplifier 18 is supplied along two parallel paths, the first being to a slope detector 20 and the second being to a level detector 22. The output of the slope detector 20 and of the level detector 22 are supplied separately to logic circuitry 24.

A radiation detector 26 or any desired combination of radiation detectors provides an output signal to radiation processing circuitry 28, which provides an output signal to logic circuitry 24. In response to receipt of suitable inputs from the slope detector 20, level detector 22 and radiation processing circuitry 28, the logic circuitry is operative to provide an output indication of detection of a projectile having predetermined characteristics.

Figure 3:
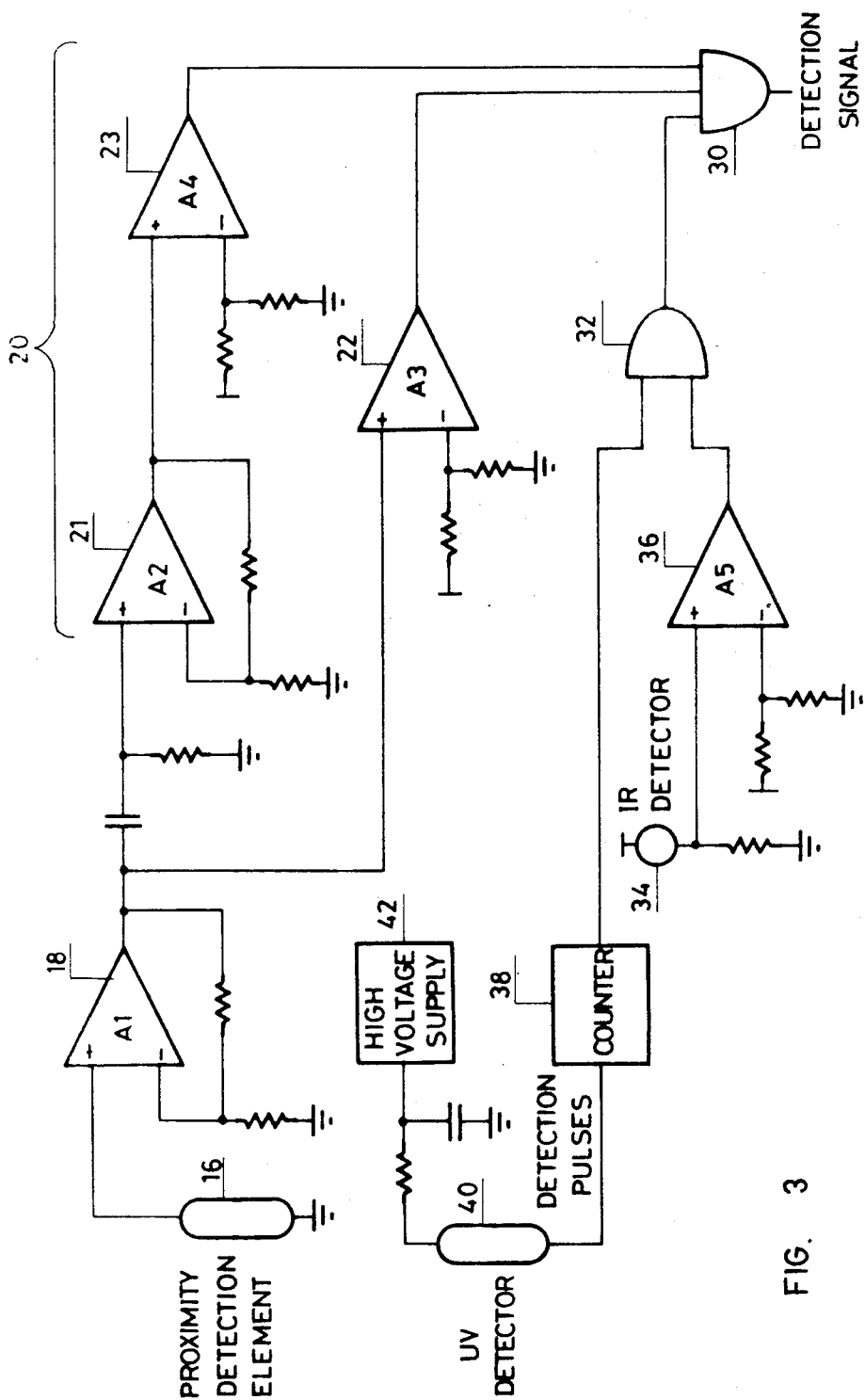
FIG. 3 is a more detailed illustration of the circuitry of FIG. 2.

Reference is now made to FIG. 3 which is a partially schematic parially block diagram illustration of the circuitry of FIG. 2. Here it is seen that the proximity sensor 16 outputs to amplifier 18 and then in parallel to a level detector 22 and to a series combination of slope detector circuit 21 and a level detector 23. Detectors 22 and 23 both output to an AND gate 30 which also receives an input from an AND gate 32. AND gate 32 receives a first input from an IR detector assembly comprising a detector element 34 and an amplifier-level detector 36. The second input to AND gate 32 is provided by a counter 38 which receives detector pulses from a UV detector 40 which is supplied with a voltage by a source 42.

Figure 4:
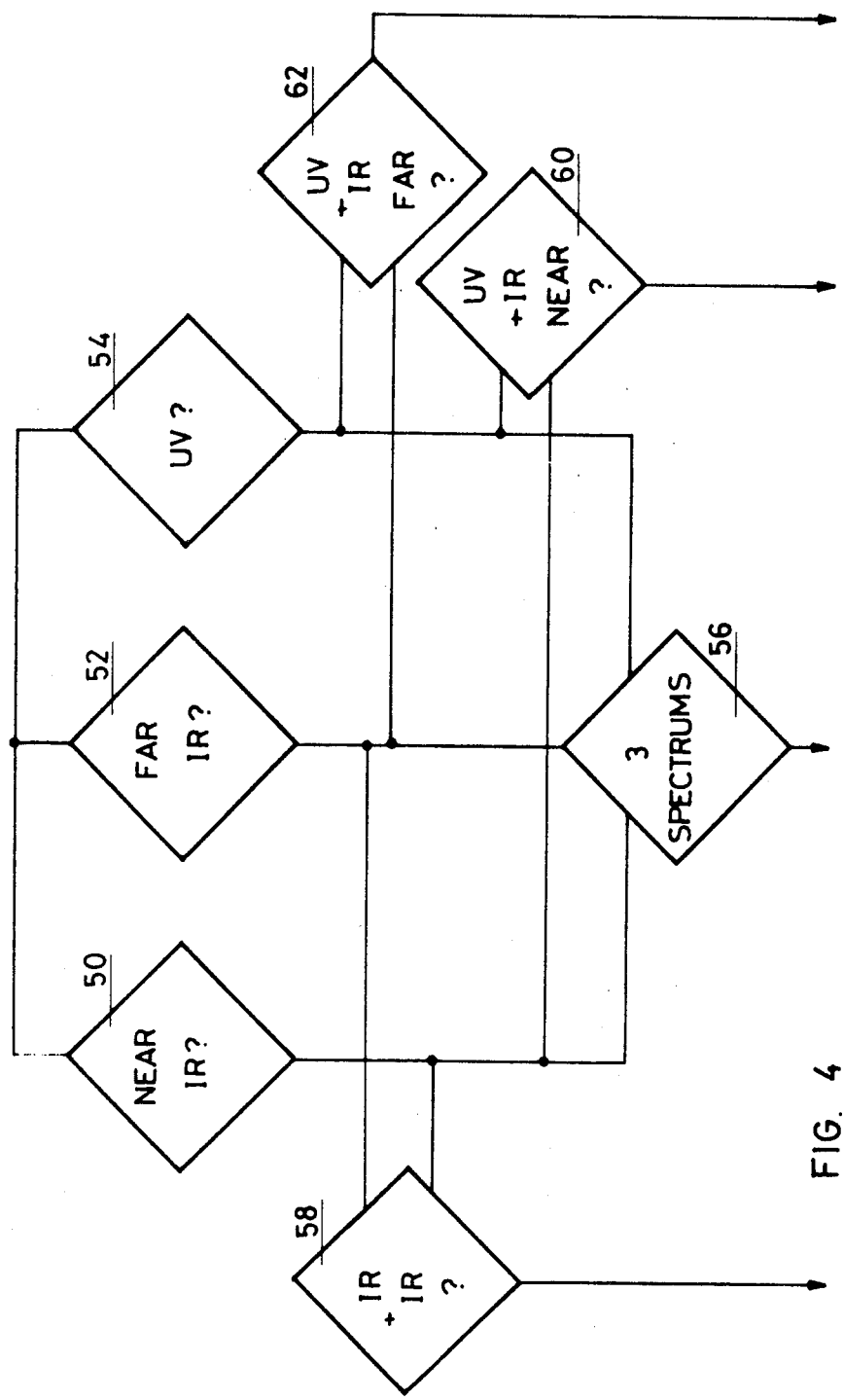
FIG. 4 is a logic diagram illustration of an alternative embodiment of a missile detector constructed and operative in accordance with the present invention.

Reference is now made to FIG. 4 which is a logic diagram illustration of an alternative embodiment of missile detector constructed and operative in accordance with an embodiment of the present invention. Here three types of basic detection interrogations are provided, inquiring whether there is detection of Near IR (in the approximate range about 0.95 μm), Far IR (in the approximate range about 4 μm) and UV. These interrogations are indicated by reference numerals 50, 52 and 54 respectively. Simultaneous detection of radiation in all three ranges is indicated at 56, while the three permutations of detections in the various ranges are indicated at 58 (IR Near and IR Far), 60 (UV and IR Near) and 62 (UV and IR Far).

Figure 5:
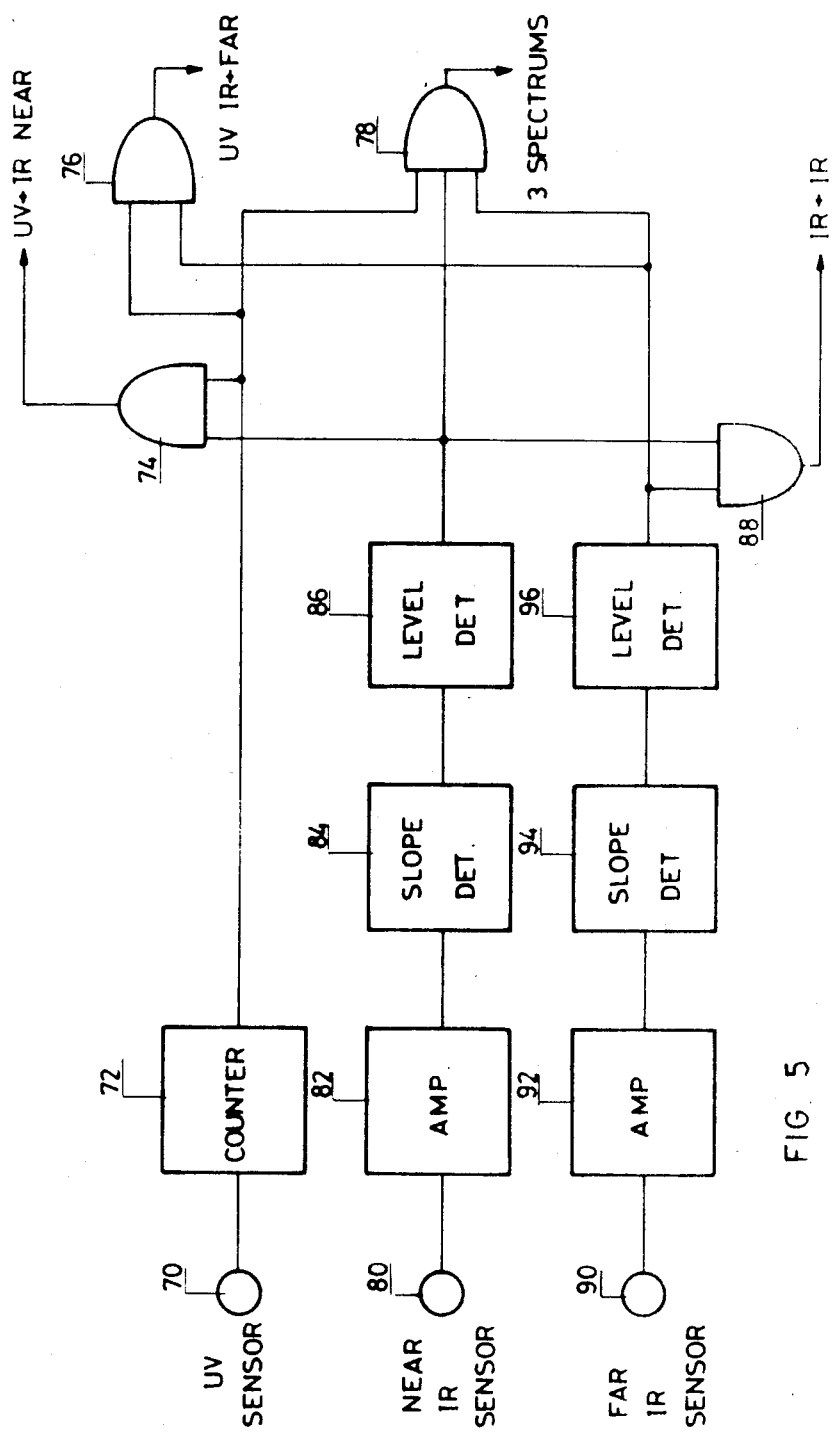
FIG. 5 is a block diagram illustration of the apparatus of FIG. 4.

The structure of the circuitry whose operation is outlined in FIG. 4 is shown in block diagram form in FIG. 5. A UV sensor 70 outputs to a counter 72 and thence to inputs of three AND gates 74, 76 and 78. A Near IR sensor 80 outputs to an amplifier 82, and thence to a slope detector 84 and a level detector 86. The output of the level detector is supplied in parallel to AND gates 74, 78 and 88. A Far IR sensor 90 outputs to an amplifier 92 and thence to a slope detector 94 and a level detector 96. The output of level detector 96 is supplied in parallel to AND gates 76, 78 and 88. AND gate 74 provides an output indication of simultaneous detection of UV and Near IR; AND gate 76 provides an output indication of simultaneous detection of UV and Far IR; AND gate 78 provides an output indication of simultaneous detection of UV, Near IR and Far IR and AND gate 88 provides an output indication of simultaneous detection of Near IR and Far IR. The Far IR sensor may typically be a lead selenide detector, such as a model 5036 made by IR Inc. of the U.S.A. The Near IR sensor may be typically a model 51337 made by Hamamatsu of Japan. Alternatively, Thermofile detectors made by Honeywell may be employed.

Figure 6:
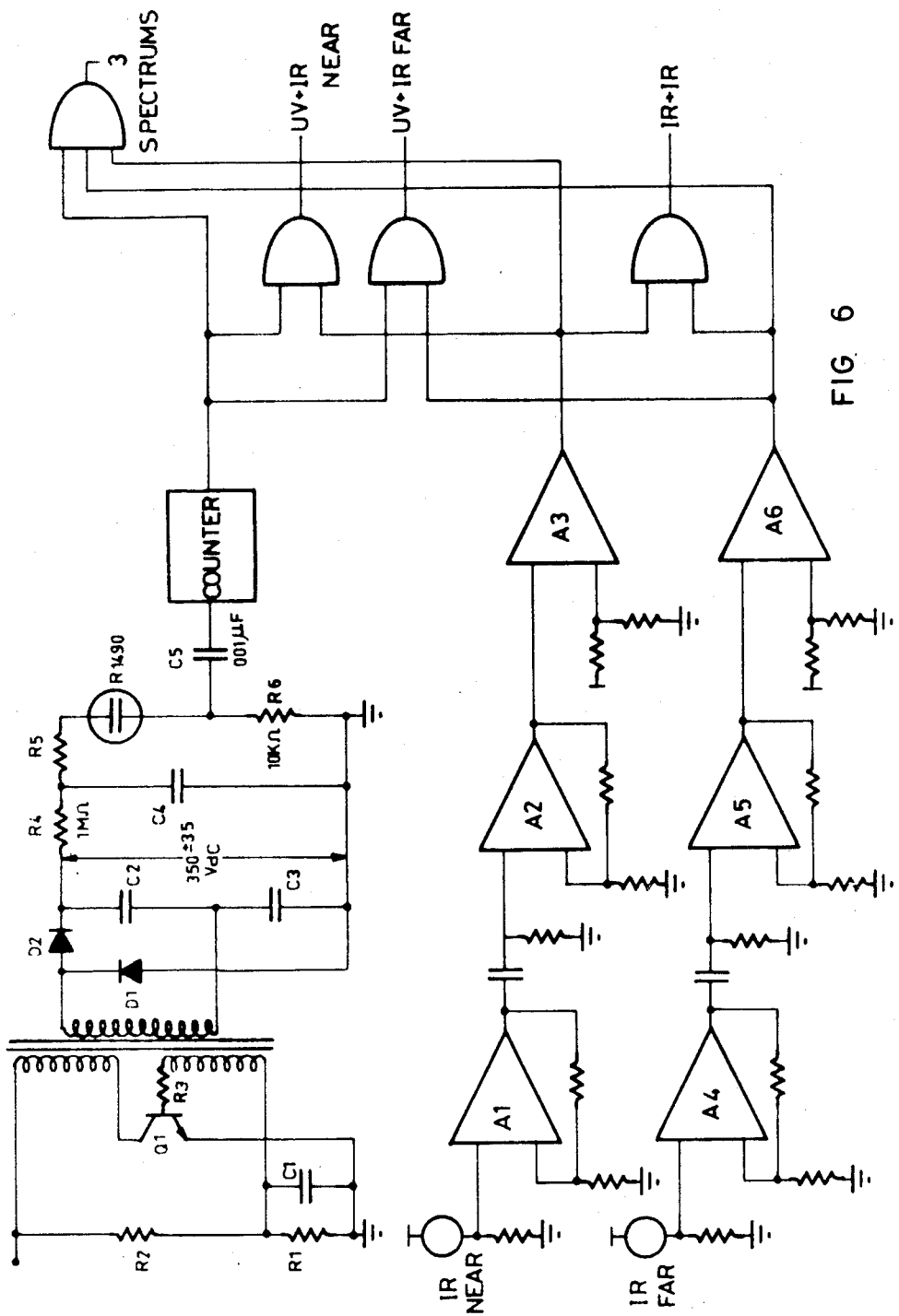
FIG. 6 is a part block diagram part schematic illustration of the apparatus of FIGS. 4 and 5.

FIG. 6 is a partially schematic, partially block diagram illustration of the circuitry of FIG. 5. It is seen from FIG. 6 that the UV sensor 70 is of conventional construction and incorporates a high voltage power source and a phototube, while the construction of the remainder of the circuitry is also of conventional design.

Figure 7:
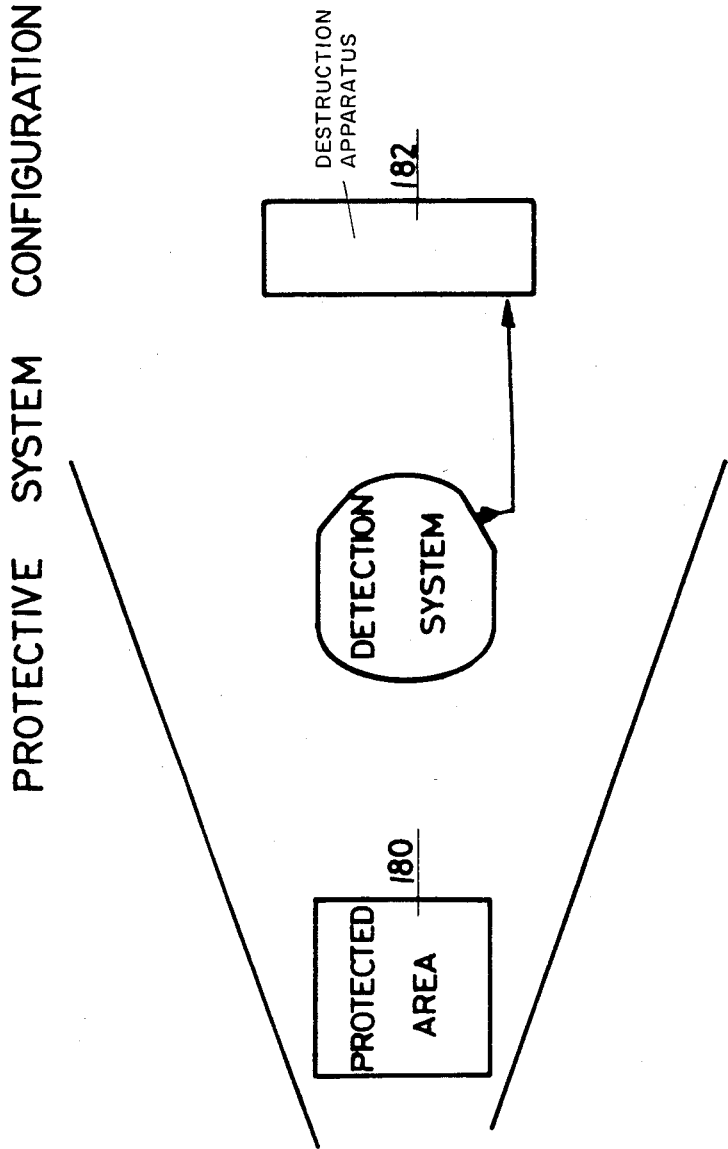
FIG. 7 is a block diagram illustration of a detection system provided in accordance with an embodiment of the invention.

Reference is now made to FIG. 7 which illustrates a protective system constructed and operative in accordance with the present invention and employing the detection apparatus described hereinbefore. The protective system is arranged to protect a protected area 180 from one or more sides. A detection system of the type described hereinbefore, or a plurality of such detection systems are disposed so as to detect incoming objects coming from the indicated direction. Detection by the detection system or systems provides an operating signal to object destruction apparatus 182 which is operative to destroy the incoming object. The destruction apparatus 182 may comprise any suitable destruction means, such as has been described in detail hereinbefore.

Figure 8:
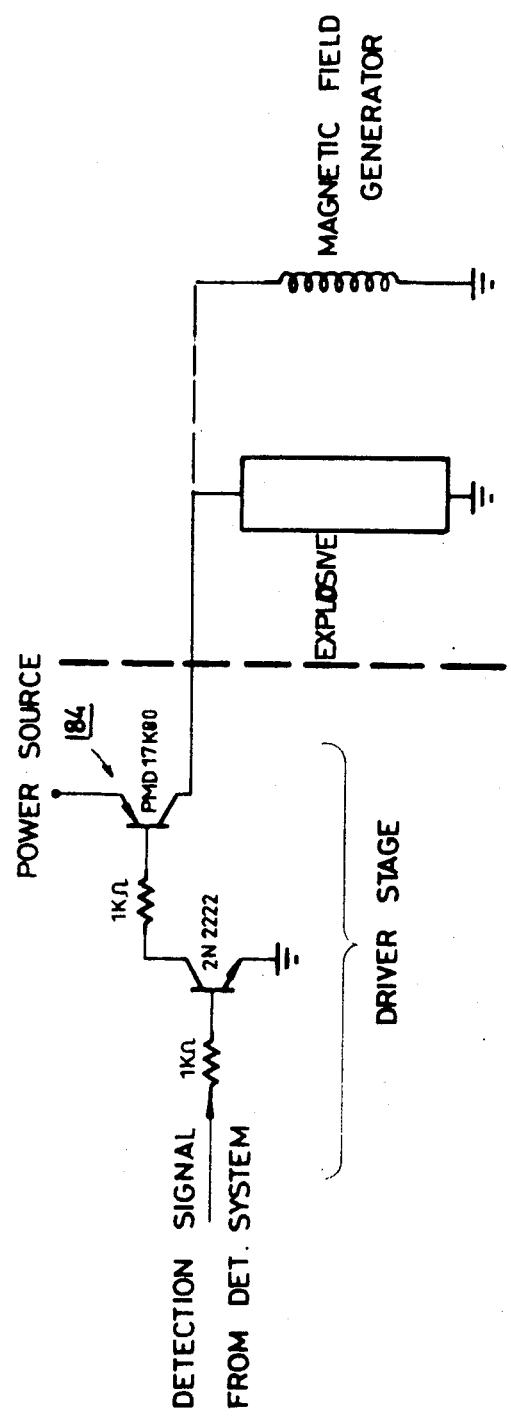
FIG. 8 is an illustration of actuation circuitry useful in the system of FIG. 7.

Driver circuitry for typical destruction apparatus is illustrated in FIG. 8. The detection signal output from the detection system is supplied to a driver circuit 184, typically comprising a pair of transistors arranged in a Darlington arrangement. The output of the driver circuit is supplied to conventional actuation circuitry for anti-incoming object projectiles or electromagnetic radiation generation. The driver circuit may be transmitted by any suitable wire or wireless means.

Figure 9:
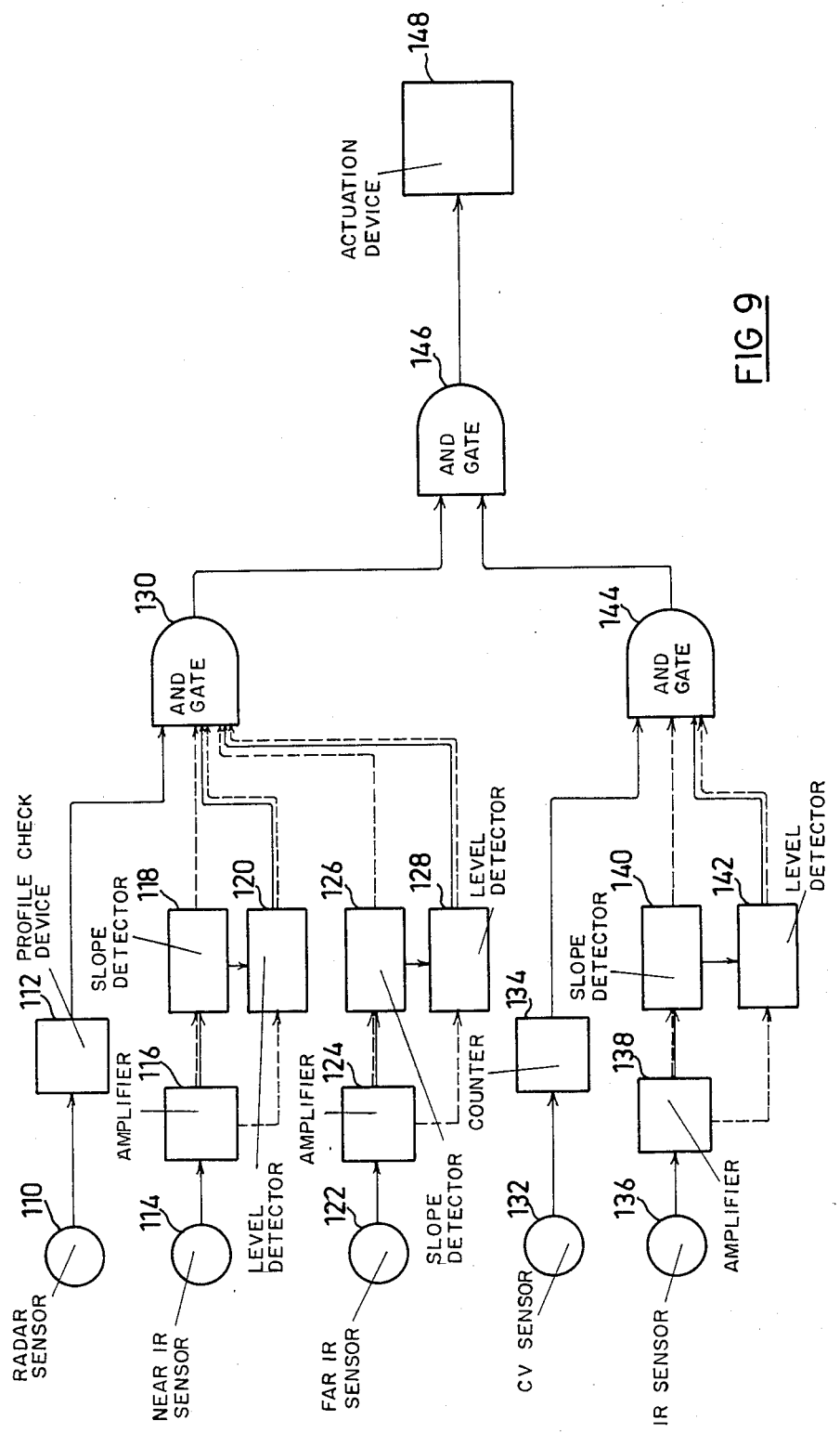
FIG. 9 is a block diagram illustration of a further alternative embodiment of a detection apparatus constructed and operative in accordance with the present invention.

FIG. 9 is a block diagrammatic representation of a further alternative embodiment of the detection apparatus of the present invention. One feature of this illustrated embodiment is that as regards the IR sensors only, output therefrom via slope and level detectors to an AND gate is depicted by solid lines when these detectors are arranged in series and by broken lines when they are arranged in parallel. By switching apparatus not shown in this figure, but well-known to those skilled in the art, each pair of slope and level detectors is adapted to be interchangeable as between series and parallel operation, as required by the operator. Radar sensor 110, Near IR sensor 114 and Far IR sensor 122, together with the relevant ancillary apparatus shown, constitute the required proximity determination apparatus in accordance with the invention. Radar sensor 110 outputs to profile check device 112, which if the signal from 110 possesses certain predetermined characteristics, in turn outputs to AND gate 130. A Near IR sensor 114 also outputs eventually to AND gate 130, via amplifier 116, slope detector 118 and level detector 120, the latter two stages being connectable in series or in parallel, as determined by the operator. A Far IR sensor 122 again outputs eventually to AND gate 130, via amplifier 124, slope detector 126 and level detector 128, the latter two stages being once more connectable in series or in parallel, as determined by the operator. AND gate 130 provides an output indication, to AND gate 146, of simultaneous proximity determination by radar (which gives a signal of predetermined characteristics) and of both Near and Far IR. UV sensor 132 and IR sensor 136 together with the relevant ancillary apparatus shown, constitute the required proximity determination apparatus in accordance with the invention. UV sensor 132 outputs to a counter 134 and thence to input of AND gate 144. IR sensor 136 also outputs eventually to AND gate 144, via amplifier 138, slope detector 140 and level detector 142, the latter two stages being yet again connectable in series or in parallel, as determined by the operator. Only when detection at UV sensor 132 and IR sensor 136 display simultaneously predetermined characteristics will a signal be output from AND gate 144 and be input to AND gate 146. The latter gate will only output to trigger alarm or destruction apparatus actuation device 148 when it has received signals from both intermediate AND gates 130 and 144. It will be evident to those skilled in the art that the apparatus described in FIG. 9 may be adapted to trigger the destruction apparatus when the incoming object displays predetermined characteristics in a predetermined location and that a plurality of such apparatus may thus cover a spectrum of predetermined locations. UV sensor 132 is typically that employed in Edison Model 630, produced by the McGraw Edison Company (U.S.A.) and operates in a wave length range of up to 0.3 μm. The Far IR sensor 122 (sensing at e.g. about 4 μm) may typically be a lead selenide detector, such as a model 5036 made by IR Inc. of the U.S.A. The Near IR sensor 114 (sensing at e.g. about 0.95 μm) may be typically a model 51337 made by Hamamatsu of Japan. IR sensor 136 (sensing at e.g. about 2.5 to 2.75 μm) may be typically a model P398R also made by Hamamatsu of Japan. Alternatively, Thermofile detectors made by Honeywell may be employed.

Figure 10:
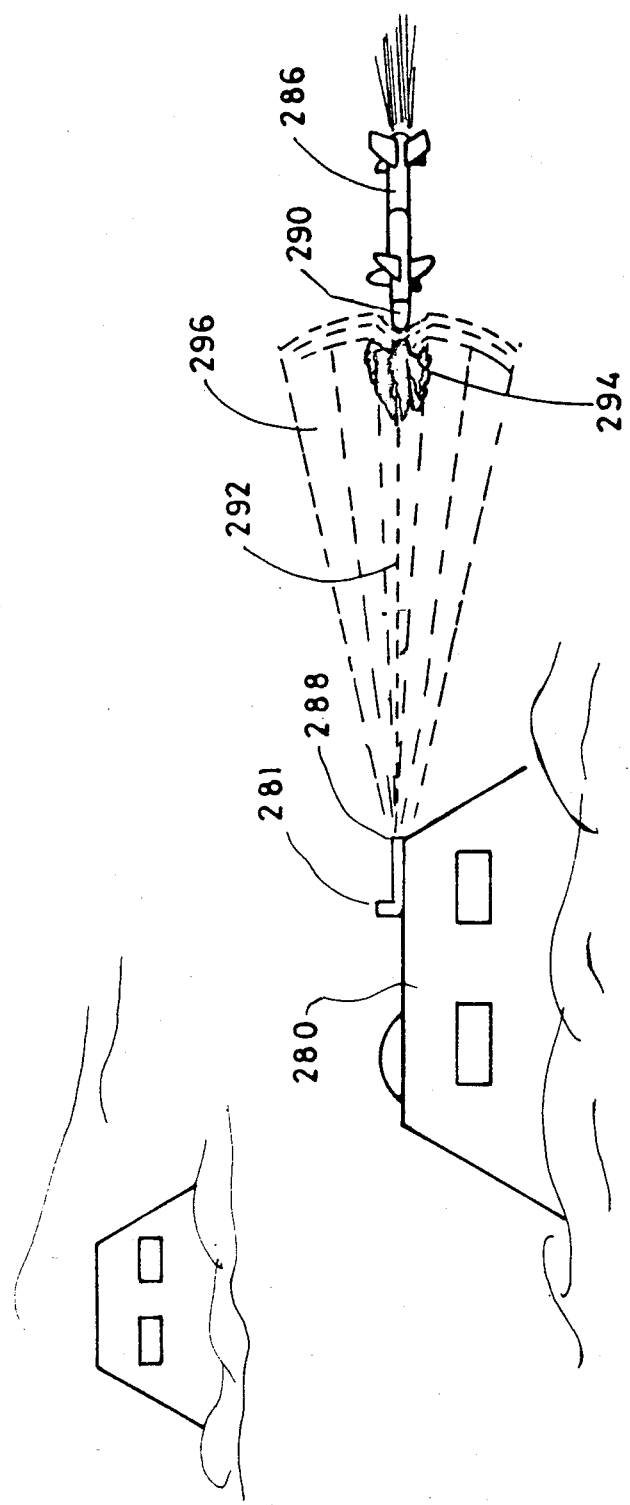
FIG. 10 is a pictorial illustration of apparatus for detection and destruction of an incoming projectile in accordance with an embodiment of the invention.

Reference is now made to FIG. 10, which illustrates apparatus for detection and destruction of incoming objects such as missiles in accordance with a preferred embodiment of the present invention. A protected area or region 280 is equipped with detection apparatus 281 of any of the types described herein, which apparatus may be located at the protected area or remote therefrom as appropriate. In response to detection of an incoming object 286, destruction apparatus, here indicated by reference numeral 288, is operated to provide an impact barrier 296, such as a high density cloud of sand, in the path 292 of the incoming object, so as to cause its warhead 290 to explode prematurely, as indicated by reference numeral 294, in a region outside the protected area. Warheads having detonation apparatus which is pressure or proximity responsive can be expected to explode prematurely under such conditions.

According to a preferred embodiment of the invention, the impact barrier, e.g. the cloud of sand may have a velocity generally opposite to that of the incoming object.

As noted hereinabove, the destruction system may comprise an explosive warhead, which may itself be comprised of either solid or powdered explosive. Alternatively, the destruction system may comprise a fragmentation warhead. In yet a further alternative, the destruction system may comprise a high density barrier of small particles, such as sand or gravel, or alternatively a liquid, such as water, which may be projected in one or more locations, so as to provide a target simulator. Such a high density barrier has a number of distinct advantages. These are: cheapness, ease of projecting to intercept the path of the incoming object by use of a propellant, the speed of impact with the incoming object will be the combined speeds of the barrier and of the object along the path of the latter, the warhead of the incoming object will normally be pressure sensitive or proximity sensitive e.g. it will usually be fused by a device such as a piezoelectric sensor, a breaker cup or a grid, so that it will be pre-detonated by the barrier short of its intended target; and lastly, the sand or gravel will be unlikely to cause serious casualties to ground personnel, compared with certain other means of destruction.

It will be appreciated by persons skilled in the art that the present invention is not limited to what has been particularly shown and described hereinabove. Rather the scope of the present invention is defined only by the claims which follow.

What is claimed is:

1. Apparatus for the detection of incoming objects, such objects being characterized by a detectable change in the observed intensity of infrared radiation emitted therefrom as said objects approach said apparatus, which comprises:
    (a) proximity determination means providing an output and comprising:
        (i) means for detecting simultaneous radiation sensing in a plurality of different ranges within the infrared range, and
        (ii) radar means;
    (b) radiation detection means providing an output and comprising at least UV radiation sensing means; and
    (c) means for providing an alarm indication only in response to a predetermined combination of outputs from said proximity determination means and said radiation detecting means.

2. Apparatus according to claim 1, and wherein said plurality of different ranges comprises Near IR and Far IR.

3. Apparatus according to claim 1, wherein said radiation detection means comprises additionally IR radiation sensing means.

4. Apparatus according to claim 1, wherein said proximity determination means includes means for determining the rate of change in detection of radiation in at least one range of said plurality of different ranges.

5. Apparatus according to claim 1, wherein said proximity determination means further includes level and slope threshold indicators connected in parallel.

6. Apparatus according to claim 1, wherein said proximity determination means further includes level and slope threshold indicators connected in series.

7. Apparatus according to claim 1, wherein said radar means is adapted to provide an output; said means for detecting simultaneous radiation sensing comprises a Near IR sensor, a Far IR sensor, means for determining the rate of change of the output of the Near IR sensor and of the Far IR sensor, threshold means for receiving the output of the rate of change determining means and providing an output indication in excess of a predetermined threshold; and ANDing means for receiving the outputs of said threshold means, said radar means and of said radiation detection means for providing an alarm actuation signal.

8. Apparatus according to claim 1, wherein said radar means is used in a complementary or supplementary manner to detect location, direction and/or speed of incoming objects.

9. Apparatus according to claim 1, wherein the proximity determination means is adapted to sense the proximity of incoming objects in at least two separate spatial segments, in one of which proximity determination means is provided by said radar means, and in another of which proximity determination means is provided by means for detecting simultaneous radiation sensing in a plurality of different ranges within the infrared range.

10. Apparatus according to claim 9, wherein the proximity determination means comprises a broadly vertical proximity determination means provided by said radar means and a broadly lateral proximity determination means provided by said means for detecting simultaneous radiation sensing.

11. Apparatus according to claim 1, wherein said radar means is utilized for proximity determination over a coincident or overlapping spatial field, as that covered by said means for detecting simultaneous radiation sensing in a plurality of different ranges within the infrared range.

12. Apparatus according to claim 1, wherein the proximity determination means includes means making use of the Doppler effect.

13. Apparatus according to claim 7, wherein the said ANDing means comprises a plurality of AND gates.

14. Apparatus according to claim 1, which is adapted to actuate destruction means for the incoming object such that the latter is destructible at at least the stand-off distance from its intended target.

15. Apparatus according to claim 1, wherein said plurality of different ranges comprises Near IR and Far IR, said radiation detection means comprises additionally IR radiation sensing means, and each Near IR, Far IR and additional IR radiation sensor outputs to a respective amplifier, slope detector and level detector, of which each pair of slope and level detectors is adapted by switching means, to be interchangeable as between series and parallel operation, as required by the operator.

16. Apparatus according to claim 1, wherein said detection apparatus is mounted on a movable base.

17. Apparatus according to claim 16, wherein said movable base comprises a wheeled vehicle.

18. Apparatus according to claim 16, wherein said movable base comprises a projectile.

19. Apparatus according to claim 14, wherein said destruction means is comprised in a projectile which includes also said detection apparatus.

20. Apparatus according to claim 1, which is adapted to detect an incoming object at a predetermined distance from its intended target.

21. System for the destruction of incoming objects, such objects being characterized by a detectable change in the observed intensity of infrared radiation emitted therefrom as said objects approach said apparatus, which comprises:
  (1) detection apparatus comprising:
    (a) proximity determination means providing an output and comprising means for detecting simultaneous radiation sensing in a plurality of different ranges within the infrared range;
    (b) radiation detection means providing an output and comprising at least UV radiation sensing means; and
    (c) means for providing an alarm signal only in response to a predetermined combination of outputs from said proximity determination means and said radiation detecting means;
  (2) actuation means triggered by said alarm signal and operative to actuate means for the destruction of incoming objects; and
  (3) said destruction means being comprised in a projectile or comprising electromagneted energy generating means.

22. System according to claim 21, wherein said proximity determination means also comprises radar means.

23. System according to claim 22, wherein said radar means is adapted to provide an output; said means for detecting simultaneous radiation sensing comprises a Near IR sensor, a Far IR sensor, means for determining the rate of change of the output of the Near IR sensor and of the Far IR sensor, threshold means for receiving the output of the rate of change determining means and means providing an output indication in excess of a predetermined threshold; and ANDing means for receiving the outputs of said threshold means, said radar means and of said radiation detection means for providing an alarm actuation signal.

24. System according to claim 22, wherein said radar means is used in a complementary or supplementary manner to detect location, direction and/or speed of incoming objects.

25. System according to claim 21, wherein said destruction means is comprised in a projectile which includes an explosive warhead.

26. System according to claim 25 wherein said explosive warhead is comprised of solid explosive.

27. System according to claim 25 wherein said explosive warhead is comprised of powdered explosive.

28. System according to claim 21, wherein said destruction means is comprised in a projectile which includes a material adapted as a target simulator for projecting into the path of the incoming object.

29. System according to claim 28 wherein said projectile includes a fragmentation warhead.

30. System according to claim 28 wherein said projectile includes a high density barrier of small particles.

31. System according to claim 28 wherein said projectile includes a liquid barrier substance.

32. System according to claim 31 wherein the liquid barrier substance is water.

33. System according to claim 21 wherein said destruction means is comprised in a projectile which is adapted to be projected into the path of the incoming object so as to meet it in a substantially head-on manner.

34. System according to claim 21 wherein said destruction means comprises electromagnetic energy generating means.

35. System according to claim 34 and wherein the electromagnetic energy generating means comprises a laser beam.

36. System according to claim 21, wherein there is included control circuitry to govern the determination of which and how many projectiles comprising such destruction means are to be utilized, and in which direction and at what times they are to be so utilized.

37. System according to claim 21, wherein the times of detection and actuation, and the characteristics of the destruction means are such that the incoming object is destructible at at least the stand-off distance from its intended target.

38. System according to claim 21, wherein said destruction means is comprise in a projectile which includes also said detection apparatus.

39. System for the destruction of incoming objects, such objects being characterized by a detectable change in the observed intensity of infrared radiation emitted therefrom as said objects approach said apparatus, which comprises:
  (1) detection apparatus according to claim 1;
  (2) actuation means triggered by said alarm signal and operative to actuate means for the destruction of incoming objects; and
  (3) said destruction means being comprised in a projectile.

* * * * *